UNITED STATES PATENT OFFICE.

EDWARD ALBERT HOLLAND, OF SOUTHEND-ON-SEA, ENGLAND.

COATING WITH METAL OF LACE AND OTHER SIMILAR GOODS AND WOVEN OR OTHER FABRICS.

1,309,032.        Specification of Letters Patent.        Patented July 8, 1919.

No Drawing. Application filed April 18, 1914, Serial No. 832,992. Renewed March 25, 1919. Serial No. 285,100.

*To all whom it may concern:*

Be it known that I, EDWARD ALBERT HOLLAND, a subject of the King of Great Britain and Ireland, residing at 6 The Mall, Southchurch Road, Southend-on-Sea, England, have invented certain new and useful Improvements in and Relating to the Coating with Metal of Lace and other Similar Goods and Woven or other Fabrics, of which the following is a specification.

This invention has for its object a process for the treatment of lace and other similar goods, whereby a surface or covering of metal is imparted to them, so that they are thus rendered particularly suitable for decoration and ornamentation and they are rendered durable and capable of being washed and cleaned without the metal surface or covering being affected. The invention is especially conceived with reference to lace goods such as table centers, doilies, and the like, but it is of wide and general application for the treatment of lace, embroidery, woven or other fabrics, applicable for any particular purpose.

According to the invention the lace or other substance to be coated or covered with metal is first treated so that it may be rendered non-absorbent by a treatment with rubber solution. The lace thus treated is secondly subjected to a further separate treatment by which the goods may be rendered pliable and by which the metal to be applied may be caused to adhere.

The goods thus subjected to preliminary treatment in two stages are then ready for application upon them of the metal. For example, gold leaf may be applied, which adheres to the goods. The goods may then have applied upon them a coating or coatings of transparent varnish.

After such treatment the goods are of a durable character and can be washed and cleaned without damage. It is preferable to effect the cleaning by lightly brushing over with cold water and a small quantity of soap, using a soft brush.

The invention comprises the treatment which is hereinafter described.

In carrying the invention into effect in the treatment of lace goods such as center pieces or doilies, the lace may first be subjected to a treatment consisting of immersion in a liquid composed of rubber in a solvent, such as turpentine and driers, followed by a brushing over with a weak solution of parchment or other size in water. The lace is then immersed in a solution of shellac in spirits of wine, or other suitable solvent. In order to prevent the lace setting rigidly and to provide an adhesive for the metal it is then treated with a solution composed of Oxford ocher and boiled or drying oil, or with any other substance by which the same effect may be attained. After a further period of about twelve hours the metal in leaf form may be applied. The goods have then applied upon them two thin coatings of fine transparent varnish or lacquer. On the drying of the second coating of varnish or lacquer the treatment of the goods is completed.

It will be understood that any suitable metal may be applied in leaf or powder or in any other suitable form.

What I claim as my invention and desire to secure by Letters Patent is:—

1. A method of treating lace and other goods, consisting in a preliminary treatment of the goods with a solution of rubber and then of size, then the application of shellac or other varnish on the goods and the drying of the goods, then the application of Oxford ocher and boiled or drying oil and the drying of the goods, and finally the application of the metal substantially as described.

2. A method of treating lace and open-textured goods similar to lace, consisting in impregnating the said goods with a solution of rubber, then applying on the goods a substance to which the metal may adhere and finally applying the metal to the goods so treated, substantially as described.

3. A method of treating lace and open-textured goods similar to lace, consisting in impregnating the said goods with a solution of rubber, then applying size, then applying shellac or other varnish thereon, drying the goods and then applying upon the goods a substance to which the metal may adhere, substantially as described.

In testimony whereof I have hereunto signed my name to this specification in the presence of two subscribing witnesses.

EDWARD ALBERT HOLLAND.

Witnesses:
 ROBERT OWEN HUGHES,
 JOHN THOMAS BUSH.

Copies of this patent may be obtained for five cents each, by addressing the "Commissioner of Patents, Washington, D. C."